United States Patent
Juvekar et al.

(10) Patent No.: US 10,541,016 B2
(45) Date of Patent: Jan. 21, 2020

(54) DUAL MODE MEMORY ARRAY SECURITY APPARATUS, SYSTEMS AND METHODS

(71) Applicant: Texas Instruments Incorporated, Dallas, TX (US)

(72) Inventors: Chiraag Juvekar, Cambridge, MA (US); Joyce Kwong, Dallas, TX (US); Clive Bittlestone, Allen, TX (US); Srinath Ramaswamy, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/120,107

(22) Filed: Aug. 31, 2018

(65) Prior Publication Data
US 2019/0019545 A1   Jan. 17, 2019

Related U.S. Application Data

(62) Division of application No. 14/794,560, filed on Jul. 8, 2015, now Pat. No. 10,068,631.

(51) Int. Cl.
*G06F 21/00* (2013.01)
*G11C 11/22* (2006.01)
(Continued)

(52) U.S. Cl.
CPC ........ *G11C 11/2295* (2013.01); *G11C 11/221* (2013.01); *G11C 11/2273* (2013.01);
(Continued)

(58) Field of Classification Search
CPC .............. G11C 11/2295; G11C 11/221; G11C 11/2277; G11C 11/2273; G11C 11/2275; H04L 9/0897; H01L 27/11507
See application file for complete search history.

(56) References Cited

U.S. PATENT DOCUMENTS 4,276,451 A * 6/1981 Beebe ................... H04M 3/241
                                                 340/2.9
9,202,554 B2   12/2015 Chu et al.
(Continued)

OTHER PUBLICATIONS

Wang, et al., "Hiding Information in Flash Memory", Proceedings of the 2013 IEEE Symposium on Security and Privacy, May 19, 2013, IEEE Computer Society, Washington, DC, US (15 pages).
(Continued)

*Primary Examiner* — Mahfuzur Rahman
(74) *Attorney, Agent, or Firm* — Ebby Abraham; Charles A. Brill; Frank D. Cimino

(57) ABSTRACT

Read-only ("RO") data consisting of a physically unclonable function ("PUF") pattern is written to a ferroelectric random-access memory ("FRAM") memory array. The FRAM array is baked to imprint the PUF pattern with a selected average depth of imprint and a corresponding average read reliability. The average depth of imprint and corresponding average read reliability are determined during testing after baking. The PUF pattern as read after baking is compared to the PUF pattern as written prior to baking. Additional PUF pattern writing and baking cycles may be performed until the average depth of imprint and associated read reliability reach a first selected level. Integrated circuits determined to be over-imprinted by exceeding a second selected level may be rejected. The first and second levels of PUF pattern imprint are selected such as to produce FRAM arrays with a unique fingerprint for each individual FRAM array-containing integrated circuit.

15 Claims, 8 Drawing Sheets

(51) Int. Cl.
*H04L 9/32* (2006.01)
*H01L 27/11507* (2017.01)

(52) U.S. Cl.
CPC ...... *G11C 11/2275* (2013.01); *G11C 11/2277* (2013.01); *H04L 9/3278* (2013.01); *H01L 27/11507* (2013.01)

(56) References Cited

U.S. PATENT DOCUMENTS

| | | |
|---|---|---|
| 9,401,196 B1 * | 7/2016 | Juvekar ............... G11C 11/2273 |
| 9,485,094 B1 | 11/2016 | Parvarandeh et al. |
| 2004/0061153 A1 | 4/2004 | Misewich et al. |
| 2004/0190322 A1 | 9/2004 | Baumann et al. |
| 2009/0210772 A1 | 8/2009 | Noguchi |
| 2014/0061969 A1 | 3/2014 | Okamoto et al. |
| 2015/0026545 A1 | 1/2015 | Yu et al. |
| 2015/0262653 A1 | 9/2015 | Chu et al. |

OTHER PUBLICATIONS

U.S. Appl. No. 14/794,560.

* cited by examiner

DUAL MODE MEMORY ARRAY SECURITY APPARATUS, SYSTEMS AND METHODS

CROSS-REFERENCE TO RELATED APPLICATION

This application is a divisional of U.S. patent application Ser. No. 14/794,560, filed Jul. 8, 2015, the disclosure of which is hereby incorporated by reference herein in its entirety.

TECHNICAL FIELD

Embodiments described herein relate to semiconductor random access memory ("RAM") and read-only memory ("ROM"), including structures and methods associated with computer device verification and data security using an imprinted memory array capable of both random access and read-only operation.

BACKGROUND INFORMATION

Electronic RAM has evolved over the years from arrays of discrete, electromagnetic "cores" of ferrite material with magnetizing and sensing windings to semiconductor memory technologies in use today. Current-technology RAM cells may be volatile or non-volatile (the latter referred to as NVRAM) to the extent that they lose the integrity of their contents when power supply rails are de-energized or the cell contents are not periodically re-written ("refreshed"). The latter occurs with dynamic RAM ("DRAM"), in widespread use over the past few decades in the computer industry due to its speed, density and low cost. Newer-technology NVRAM including flash memory and ferroelectric RAM ("FeRAM" or "FRAM") are evolving developmentally in terms of speed, density and cost reduction. The fast evolution of hand-held computing devices including smart phones and tablet computers is a large driving factor in the evolution of NVRAM technologies.

Semiconductor RAM technology has been based largely on memory cells which include capacitance as the basic storage element. Typically a two-dimensional matrix of capacitors or capacitor/transistor pairs forms a memory bit array. A particular capacitor in the array is addressed by row and column driver and/or sense lines. Typically a bit is written by charging the capacitor and the corresponding bit is read by sensing the voltage across the capacitor or by discharging the capacitor and sensing the current flow. In the case of DRAM, a cell capacitor's dielectric material leaks charge quickly after the cell has been written, requiring refresh. In the case of the flash memory type of NVRAM, a high-quality dielectric barrier associated with a floating gate transistor holds electrons pushed across the barrier using a high voltage produced by a charge pump power supply. The charge is maintained indefinitely and thus flash memory is non-volatile at power-off.

In the case of FRAM memory, the capacitor includes a "ferroelectric" fabricated between the plates rather than a dielectric as in the case of a standard capacitor. A characteristic of ferroelectric material such as lead zirconate titanate is that it includes a crystalline lattice of molecules capable of forming and trapping electric dipoles. When the ferroelectric capacitor in an FRAM cell is charged, electric dipoles are aligned in a semi-permanent orientation according to the polarity of a voltage applied across the plates of the capacitor. The dipoles are trapped in that orientation in the crystalline lattice, thus establishing a state in the capacitor that is non-volatile at power-off.

FIG. 1 is a prior-art schematic diagram of a two-transistor, two-capacitor ("2T/TC") single-bit FRAM storage cell 100. The 2T/2C FRAM architecture and its operation will be described and used in examples hereunder. It is noted, however, that some FRAM arrays may be fabricated using 1T/1C cells. In the case of 2T/2C architecture, the ferro-electric capacitor associated with each half-cell is normally charged to the opposite polarity of the other half-cell capacitor. At read-out, the read signal is the algebraic difference between the voltages created by the opposite charges on the two half-cells. In general, this difference results in a greater read-out voltage margin than would be available from a 1T/1C storage cell. It is also noted that the description that follows uses the terms "negatively charged" and "storing a logical 0" synonymously when referring to the state of a half-cell so charged. Likewise, the description uses the terms "positively charged" and "storing a logical 1" synonymously when referring to the state of a half-cell so charged. This terminology is used for clarity and convenience. However it is noted that referring to a 2T/2C half-cell as storing a logical state is not entirely correct insofar as a half-cell of a 2T/2C FRAM cell stores a charge and the full 2T/2C cell stores the logical state of the cell as interpreted by the sense amplifier as described below.

In general, the 2T/2C cell operates as follows. The cell is prepared for writing a "1" by presenting a "1" (voltage high) at the cell bit line 103 and closing the write switches 104. First, a logical "0" is written to the right half-cell 105. With the right half-cell bit line 108 low from the negated right half-cell driver 112 and the word line 115 active, the plate line 118 is pulsed high. Doing so applies a negative voltage across the right half-cell capacitor 121 and causes dipoles inside its ferroelectric material to be aligned in a "negative" direction. Next, a logical "1" is written to the left half-cell 125 by reverting the plate line 118 back to ground while the left half-cell bit line 130 is driven high by the left half-cell driver 134. Doing so applies a positive voltage across the left half-cell capacitor 140 and causes dipoles inside its ferroelectric material to be aligned in a "positive" direction. A logical "0" is written to the FRAM cell 100 by reversing the polarities of the above-described operations.

A read operation is accomplished by first pre-discharging both half-cell bit lines 108 and 130. The write switches 104 are opened to leave the two half-cell bit lines 108 and 130 floating. The read switches 145 are closed. The word line 115 is enabled and the plate line 118 is pulsed high. The different polarization charges on the two half-cell capacitors 121 and 140 cause the two bit lines 108 and 130 to settle to different voltages. The voltage differential is sensed at the sense amp 150.

For the example described above of a "1" stored in the left half-cell 125 and a logical "0" stored in the right half-cell 105, the read-out operation applies the same polarities to the right half-cell capacitor 121 as written. Doing so results in only a small charge movement to the right-side bit line 108 and the polarity of capacitor 121 remains as charged during the write operation. However, the read operation reverses the polarity of the left half-cell capacitor 140 and results in a larger charge flow to the left-side bit line 130. The sense amp 150 output swings high, to a "1" state, due to the larger signal on the positive input resulting from the polarity reversal at the left half-cell capacitor 140. Thus, the data bit "1" written to the 2T/2C storage cell 100 in the write sequence described above is read out as a "1" as is expected.

FIG. 2 is a prior-art statistical plot showing distribution curves 205 and 210 for bit line signal voltages 215 during read-out for a number 218 of 2T/2C FRAM half-cells. The read-out voltages represented by the distribution curves 205 and 210 correspond, for example, to the voltages seen on the bit lines 108 and 130 of FIG. 1 during read-out. The voltage differential 220 between half-cells bit lines is sensed by the sense amp 150 of FIG. 1 as described above and determines the margin of accuracy of the read-out data. It is noted that, for the capacitor polarization and corresponding logic levels of the half-cells of the example 2T/2C FRAM cell of FIG. 1, the lower-voltage half-cell voltage distribution curve 205 represents negatively charged half-cells storing a logical "0." The higher-voltage half-cell voltage distribution curve 210 represents positively charged half-cells storing a logical "1." Of course the logic levels may be reversed in some implementations.

Assume, for example, the sense amp 150 input polarities and the storage of a logical "1" in the storage cell 100 as described with reference to FIG. 1. In that case, the curve 205 represents the right half-cell, the curve 210 represents the left half-cell, and the voltage differential 220 is approximately equal to 1.38V−0.54V=+0.84V. A logical "0" stored in the 2T/2C cell 100 of FIG. 1 would result in a voltage differential 220 of approximately −0.84V. The sense amp 150 typically operates like a voltage comparator in that the output state reflects the polarity of the input voltage differential 220.

U.S. patent application Ser. No. 14/737,247 filed Jun. 11, 2015 discloses generalized structures and methods associated with a memory array capable of storing two bits per storage cell. A read-only ("RO") bit is imprinted during manufacturing and is accessible post-manufacturing via a special read procedure. The imprinted cell remains capable of normal read-write ("R/W") operation, however. A memory array including such two bit per cell structures is termed "dual mode memory array." U.S. patent application Ser. No. 14/737,247 filed Jun. 11, 2015 is incorporated herein by reference in its entirety.

SUMMARY OF THE INVENTION

Figure 1:
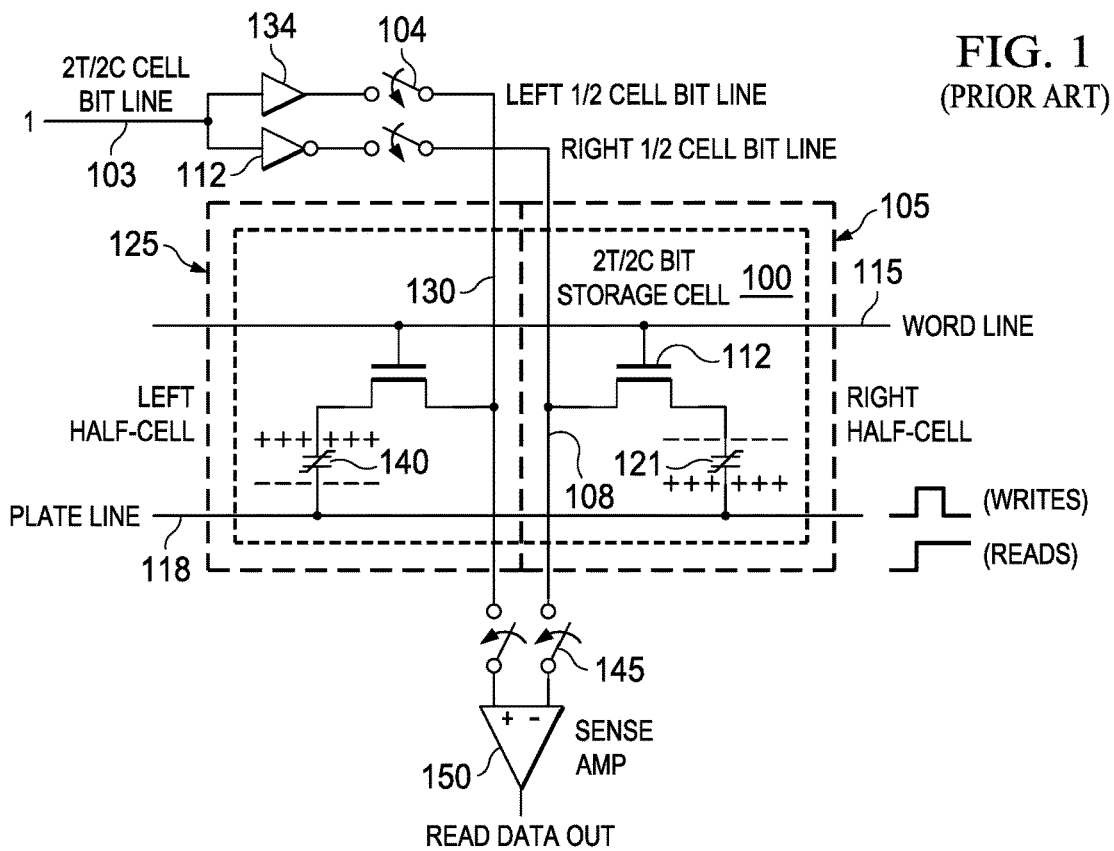
FIG. 1 is a prior-art schematic diagram of a two-transistor, two-capacitor single-bit FRAM data storage cell.

Structures and methods described herein imprint RO data to storage cells of a dual mode memory array during manufacturing. The imprinted data is accessible via a special read operation as further described below. An integrated circuit containing the imprinted dual mode memory array may include authentication mechanisms to restrict access to the RO data. The RO data may include expected system state information, serial numbers, cryptography keys, etc. Authentication provides a security component to avoid unauthorized access to the RO data and emulation or cloning of the RO data. For purposes of system state verification as further described below, cryptographic data is stored as content-centric RO data.

Some methods of manufacturing a dual mode memory array for use in a security apparatus intentionally limit the average "depth" or degree of imprinting of the RO data to a selected range. Some cells of a memory array imprinted to an average depth within the selected range will be more strongly imprinted than other cells due to chip-to-chip material and process variations. The range is selected such that strongly-imprinted cells read out the state written prior to the imprint process. However, more weakly-imprinted cells may read out in a "stuck" state or may read out ambiguously at each read operation. Such chip-to-chip variation between the RO data pattern read following imprinting of a common RO data pattern written is largely random and results in a physically unclonable function ("PUF"). As used herein, "PUF pattern" or "as-written PUF pattern" refers to the binary sequence of RO data written to the dual mode memory array prior to imprint. "As read PUF pattern" refers to the binary sequence read from the dual mode memory array including read errors resulting from RO data reads of the states of weakly-imprinted cells. PUF generation provides unique chip-to-chip identification numbers, cryptography keys, etc. without having to write data fields unique to each chip during manufacturing. For purposes of PUF generation as further described below, cryptographic data is stored as memory location or memory pattern-centric RO data.

As used herein, the term "imprint" means to apply an over-stress condition to one or more state-determining elements of one or more storage cells of the array after the state-determining elements have been set to a selected state. Imprinting permanently biases a value of a state-determining property associated with the state-determining element without incapacitating normal operation of the storage cell. A "state-determining element" as used herein means a structure capable of existing in two or more states and whose logical state determines the state of the storage cell. For example, a state-determining element of a FRAM storage cell is a ferroelectric capacitor. A FRAM capacitor can be polarized positively or negatively by applying a positive or negative voltage across the capacitor. The direction of polarization of the ferroelectric capacitor(s) determines the logical state (e.g., logical "1" or logical "0") of the FRAM storage cell.

A "state-determining property" as used herein is a property of the state-determining element such as an electrical property, a mechanical property, an electromagnetic property, a chemical property, an electro-chemical property, a property of a sub-atomic particle, etc. When altered, the value of a state-determining property biases the cell read-out signal in a detectable way. For example, the state-determining property of a FRAM ferroelectric capacitor is polarization of the ferroelectric material after a polarizing voltage associated with a write operation is removed. A particular polarity results when a number of electric dipoles within the ferroelectric layer become aligned in a particular direction according to the polarity of the write voltage applied across the capacitor. The electric dipoles are trapped in the aligned direction within the ferroelectric crystal lattice when the polarizing voltage is removed, leaving a polarization charge on the capacitor. The amount of polarization charge is proportional to the number of trapped dipoles. Thus, for a FRAM storage cell, the state-determining property may be thought of as a polarization charge stored in the ferroelectric layer resulting from its internal aligned electric dipoles. The value of the state-determining property is the post-write number and direction of electric dipoles in the ferroelectric layer.

An over-stress condition as used herein is a controllable environmental variable such as heat, over-voltage, over-current, mechanical stress applied to a particular point in a particular direction, etc. as applicable to a particular storage cell technology. Embodiments and methods herein intentionally apply an over-stress condition to the storage cell during manufacturing in order to permanently bias the cell state-determining property in a direction corresponding to the cell state at the time that the over-stress condition is applied. Doing so is referred to herein as "imprinting" the cell state as an RO data bit (also "imprinted RO bit" or "imprinted RO data").

Permanently biasing the cell state-determining property by a process-determined amount during imprint does not lock the state-determining property to a set value. The state-determining property continues to be capable of being modified via normal cell write operations. That is, the imprinted cell continues to be capable of R/W operations after being imprinted. However, the bias created during imprinting may be used to access the imprinted RO bit using a special read operation. Thus, each cell of a memory array imprinted as disclosed herein may store two logical bits of information, an R/W bit accessible via normal R/W operations and an imprinted RO bit. The resulting structure is termed "dual mode storage cell" or "dual mode memory cell" and a group thereof is a "dual mode storage array" or "dual mode memory array."

Structures and methods herein disclose data imprint techniques using a 2T/2C FRAM cell as an example technology capable of dual mode operation. However, it is noted that other memory cell technologies which include state-determining elements with state-determining properties capable of being biased via over-stress conditions without precluding ongoing R/W operation are included in the structures and methods described herein. And, similar embodiments and methods may apply to other ferroelectric capacitor-based memory architectures such as 1T/1C FRAM cell arrays and to ferroelectric capacitor-based memory arrays without transistors or other pass devices.

During normal operation, a bit can be written to a 2T/2C FRAM cell by changing both half-cell states as describe above with reference to FIG. 1. That is, a voltage is applied across the capacitor associated with each half-cell such as to re-align the electric dipoles in the ferroelectric layer of the capacitor. The dipoles remain in the corresponding aligned states in the ferroelectric crystalline layer after the write voltage is removed. However, the FRAM cell may be written to the opposite state by re-applying write voltages of opposite polarity to the capacitors to re-align the electric dipoles in the opposite direction. Thus, the example 2T/2C FRAM cell is capable of R/W operation.

Embodiments and methods herein pre-write an array of 2T/2C FRAM cells to a desired RO state during manufacturing by performing full-cell write operations as previously described with reference to FIG. 1. Heat is then applied to the FRAM cell array during one or more baking cycles. Doing so establishes a permanent charge imprint on the plates of each half-cell by permanently trapping a number of electric dipoles of the ferroelectric layer in their direction of orientation during the baking process. The number of dipoles permanently trapped and thus the permanent charge bias on each half-cell is a function of the baking temperature, duration, number of bake cycles, etc.

The magnitude and polarity of the permanent charge bias results in a read-out voltage for each half-cell that is offset from the read-out voltage of a half-cell in a non-imprinted array when the half-cell is written to a state opposite to the imprinted state. The offset results from the algebraic contribution to the read-out voltage of the subset of electric dipoles permanently trapped in the ferroelectric in the imprinted direction. The imprinted dipoles are incapable of reorienting themselves when an opposite-polarity electric field is applied to the capacitor to re-write the half-cell to the opposite state. The imprinted dipoles thus algebraically subtract from the read-out voltage that would be seen if all available dipoles were to be oriented in the same direction as is the case with a non-imprinted 2T/2C FRAM capacitor half-cell.

DETAILED DESCRIPTION

Figure 3:
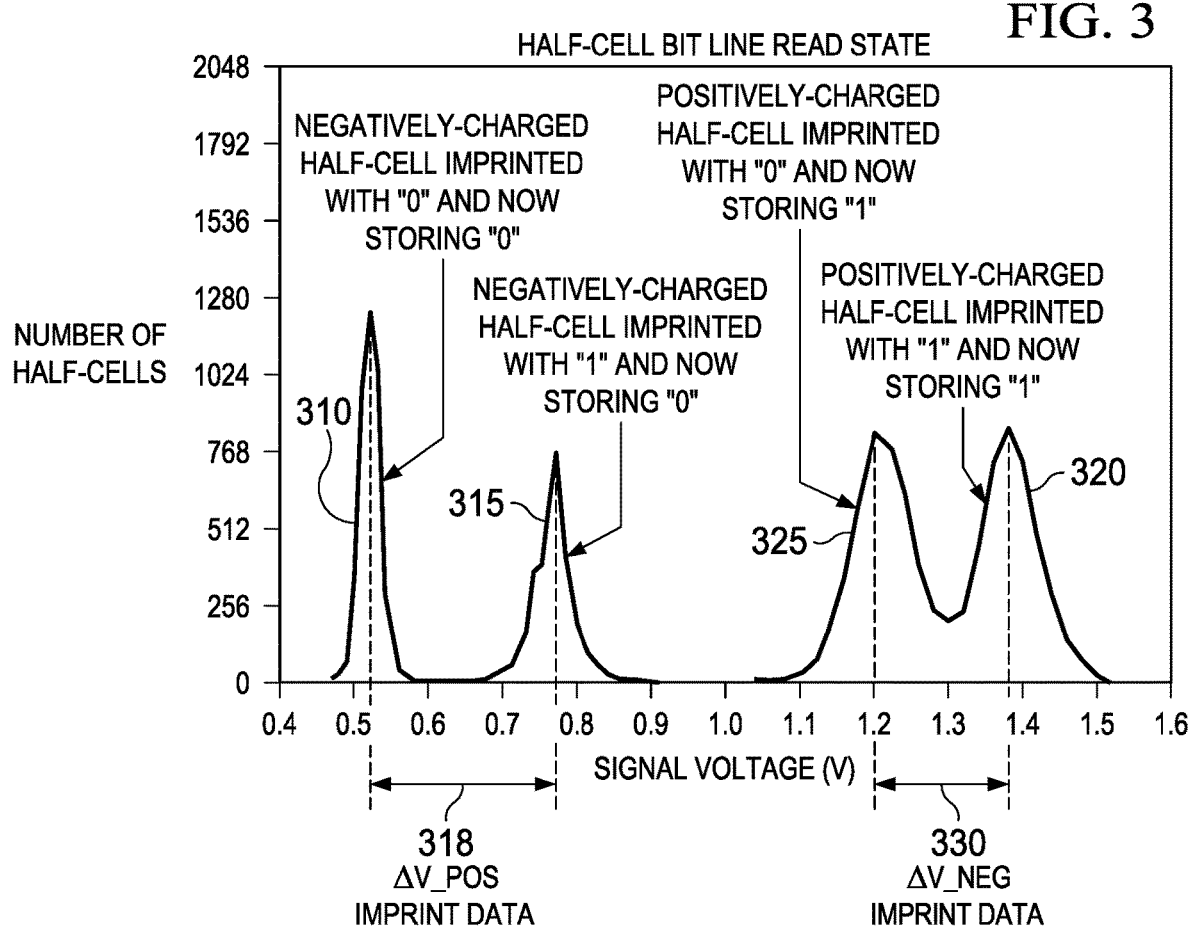
FIG. 3 is a statistical plot showing distribution curves of bit line signal voltages during read-out for a number of 2T/2C FRAM half-cells imprinted with data during manufacturing according to various example methods and embodiments.

FIG. 3 is a statistical plot showing distribution curves 310, 315, 320, and 325 of bit line signal voltages during read-out for a number of imprinted 2T/2C FRAM half-cells. The FRAM cells were imprinted with RO data during manufacturing according to various example methods and embodiments.

Figure 2:
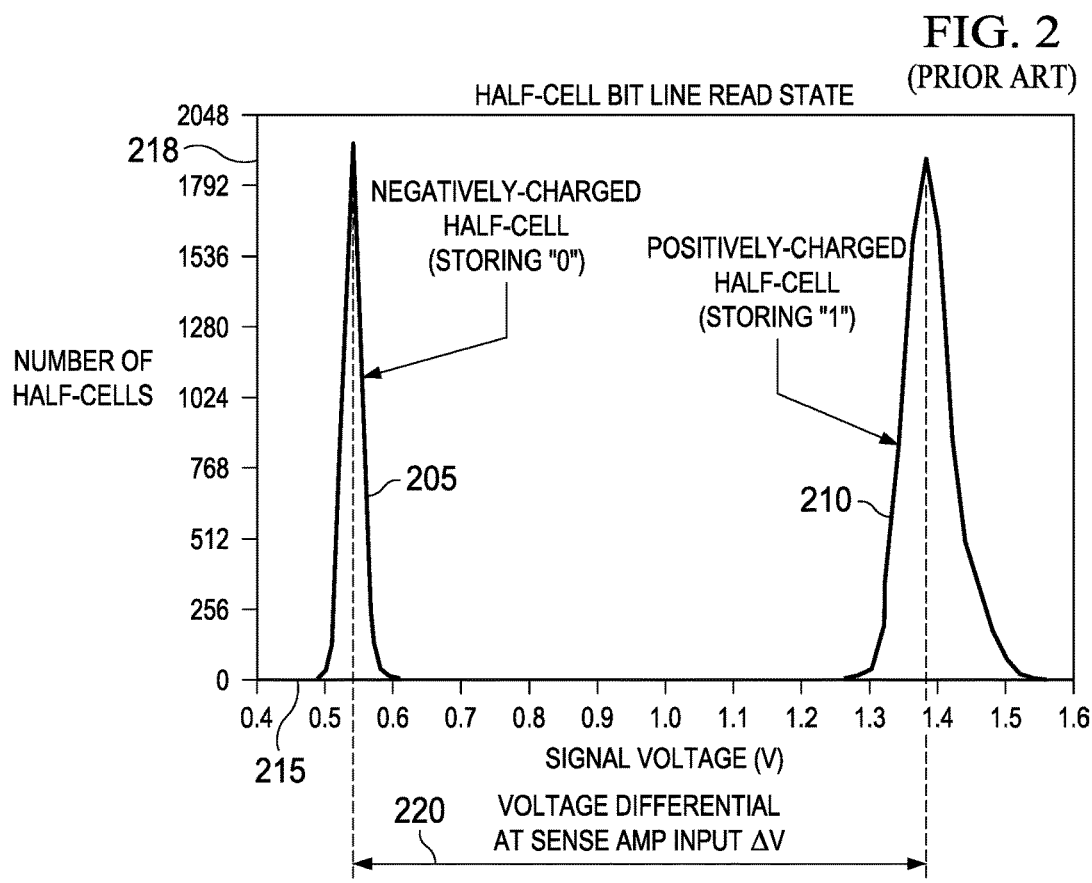
FIG. 2 is a prior-art statistical plot showing distribution curves of bit line signal voltages during read-out for a number of 2T/2C FRAM half-cells.

Curves 310 and 315 illustrate read-out voltages of half-cells currently negatively charged (e.g., half-cells currently storing a logical "0"). Voltages represented by the curve 310 result from half-cells that were imprinted with a logical "0," while voltages represented by the curve 315 were imprinted with a logical "1." The half-cells displaying bit line signal voltages represented by the curve 310 are permanently biased with a negative polarization charge as the ferroelectric material of each of those capacitors contains a certain number of electric dipoles that are permanently trapped in a negatively-oriented direction. The negative bias does not show up in the sense signal voltages 310 for half-cells that are currently negatively charged. The reason is that the ferroelectric dipoles of such negatively-charged half-cells are all negatively oriented anyway as they would be for a non-imprinted negatively charged half-cell such as the half-cells associated with the curve 205 of FIG. 2.

On the other hand, the half-cells displaying bit line signal voltages represented by the curve 315, although currently negatively charged, are permanently biased with a positive polarization charge as the ferroelectric material of each of those capacitors contains a certain number of electric dipoles that are permanently trapped in a positively-oriented direction due to imprint. The imprinted permanent positive polarization charge bias algebraically subtracts from the negative polarization charge that would be present on such half-cells in the absence of imprint. This results in an upward shift in the bit line signal voltages appearing at such cells during read-out by an amount equal to deltaV_POS 318.

Some embodiments herein read the imprinted RO data by performing sequential or simultaneous half-cell writes of a logical "0" to both half-cells of one or more full cells in a 2T/2C FRAM array. Doing so creates the condition in the full cell represented by the curves 310 and 315. That is, regardless of whether a pre-bake full-cell write of a logical "1" or a logical "0" as the full-cell RO data bit was performed, one of the half-cells will have been imprinted with a logical "1" and the other half-cell will have been imprinted with a logical "0" during the bake process. The read sense output voltage from the half-cell imprinted with a logical "0" will be as represented by the curve 310. The read sense output voltage from the half-cell imprinted with a logical "1" will be as represented by the curve 315. These half-cell output voltages will appear as deltaV_POS 318 across the sense amplifier (e.g., the sense amplifier 150 of FIG. 1) during a full-cell read operation immediately following the half-cell writes of all logical "0s."

Using the example case of the 2T/2C cell described with respect to FIG. 1, a full-cell pre-bake RO data bit of "1" would have been written by storing a "0" in the right half-cell 105. The voltage of the curve 310 would therefor appear on the sense line 108 and at the negated input of the sense amplifier 150. The full-cell pre-bake write of a "1" would have stored a "1" in the left half-cell 125. The higher voltage of the curve 315 would therefor appear on the sense line 130 and at the non-negated input of the sense amplifier 150, causing the sense amplifier output to swing high and to therefor reflect the state of the imprinted RO data bit as a "1." A similar explanation substituting opposite polarities results in the read-out of an imprinted "0" RO bit using the example method. The polarity of deltaV_POS 318 reflects the state of the RO data bit. In summary, writing "0s" to all half-cells of a number of full cells from which imprinted RO data is to be extracted and then reading each full cell using a normal full-cell read sequence provides access to the imprinted RO data. It should be noted that writing logical "0s" to both half-cells in a full cell is different from a normal write operation. A normal write operation writes a logical "0" to one half-cell and a logical "1" to the other half-cell.

In similar fashion, curves 320 and 325 illustrate read-out voltages of half-cells currently positively charged (e.g., half-cells currently storing a logical "1"). Voltages represented by the curve 320 result from half-cells that were imprinted with a logical "1" while voltages represented by the curve 325 were imprinted with a logical "0." The half-cells displaying bit line signal voltages represented by the curve 320 are permanently biased with a positive polarization charge as the ferroelectric material of each of those capacitors contains a certain number of electric dipoles that are permanently trapped in a positively-oriented direction. The positive bias does not show up in the sense signal voltages 320 for half-cells that are currently positively charged. The reason is that the ferroelectric dipoles of such positively-charged half-cells are all positively oriented anyway as they would be for a non-imprinted positively-charged half-cell such as the half-cells associated with the curve 210 of FIG. 2.

On the other hand, the half-cells displaying bit line signal voltages represented by the curve 325, although currently positively charged, are permanently biased with a negative polarization charge as the ferroelectric material of each of those capacitors contains a certain number of electric dipoles that are permanently trapped in a negatively-oriented direction due to imprint. The imprinted permanent negative-charge bias algebraically subtracts from the positive polarization charge that would be present on such half-cells in the absence of imprint. This results in a downward shift in the bit line signal voltages appearing at such cells during read-out by an amount equal to deltaV_NEG 330.

Some embodiments herein read the imprinted RO data by performing sequential or simultaneous half-cell writes of a logical "1" to both half-cells of one or more full cells in a 2T/2C FRAM array. Doing so creates the condition in the full cell represented by the curves 320 and 325. That is, regardless of whether a pre-bake full-cell write of a logical "1" or a logical "0" as the full-cell RO data bit was performed, one of the half-cells will have been imprinted with a logical "1" and the other half-cell will have been imprinted with a logical "0" during the bake process. The read sense output voltage from the half-cell imprinted with a logical "0" will be as represented by the curve 325. The read sense output voltage from the half-cell imprinted with a logical "1" will be as represented by the curve 320. These half-cell output voltages will appear as deltaV_NEG 33 across the sense amplifier (e.g., the sense amplifier 150 of FIG. 1) during a full-cell read operation immediately following the half-cell writes of all logical "1s."

Using the example case of the 2T/2C cell described with respect to FIG. 1, a full-cell pre-bake RO data bit of "1" would have been written by storing a "0" in the right half-cell 105. The voltage of the curve 325 would therefor appear on the sense line 108 and at the negated input of the sense amplifier 150. The full-cell pre-bake write of a "1" would have stored a "1" in the left half-cell 125. The higher voltage of the curve 320 would therefor appear on the sense line 130 and at the non-negated input of the sense amplifier 150, causing the sense amplifier output to swing high and to therefor reflect the state of the imprinted RO data bit as a "1." A similar explanation substituting opposite polarities results in the read-out of an imprinted "0" RO bit using the example method. The polarity of deltaV_NEG 330 reflects the state of the RO data bit. In summary, writing "1s" to all half-cells of a number of full cells from which imprinted RO data is to be extracted and then reading each full cell using a normal full-cell read sequence provides access to the imprinted RO data.

Some embodiments thus perform read-out of the imprinted RO data by first writing all half-cells corresponding to full 2T/2C FRAM cells from which imprinted RO data is to be read to the same predetermined state ("pre-read state"), either all logical "1s" or all logical "0s." The immediately-subsequent full-cell read operation performed on each such full cell reflects the imprinted RO data bit associated with the cell.

Figure 4:
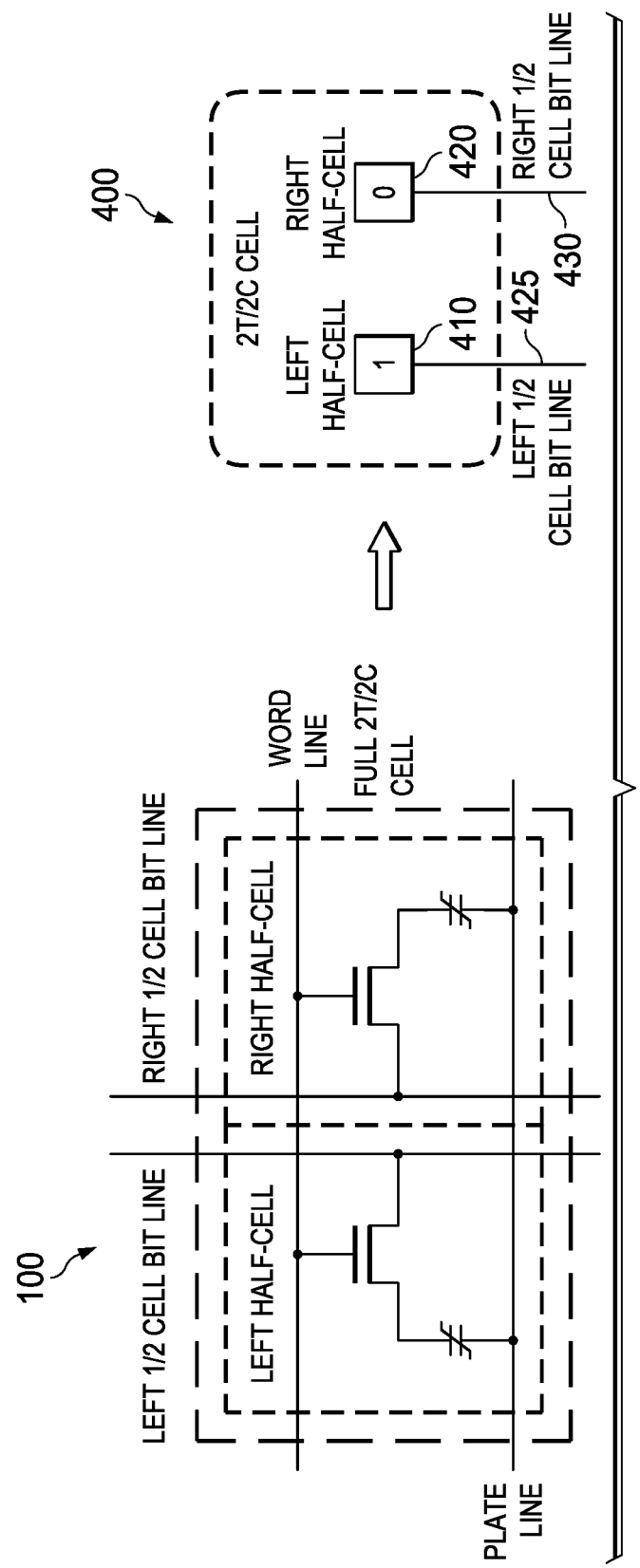
FIG. 4 is a simplified equivalency diagram of a dual mode 2T/2C FRAM cell according to various example embodiments.

FIG. 4 is a simplified equivalency diagram of a dual mode 2T/2C FRAM cell 400 according to various example embodiments. Having reviewed the operation of a more detailed schematic diagram of the 2T/2C FRAM cell 100 of FIG. 1, the abbreviated diagram 400 of the 2T/2C FRAM cell associated with sequences and embodiments herein will be used henceforth for the sake of brevity and clarity. Left and right half-cells 410 and 420 and left and right half-cell bit lines 425 and 430, respectively, are as shown. A positive state of polarization is shown in a half-cell as a logical "1" and a negative state of polarization as a logical "0." An unknown or "don't care" state will be shown as an "X." The full cell 400 is shown as storing a logical "1," assuming the polarities described with respect to FIG. 1.

Figure 5:
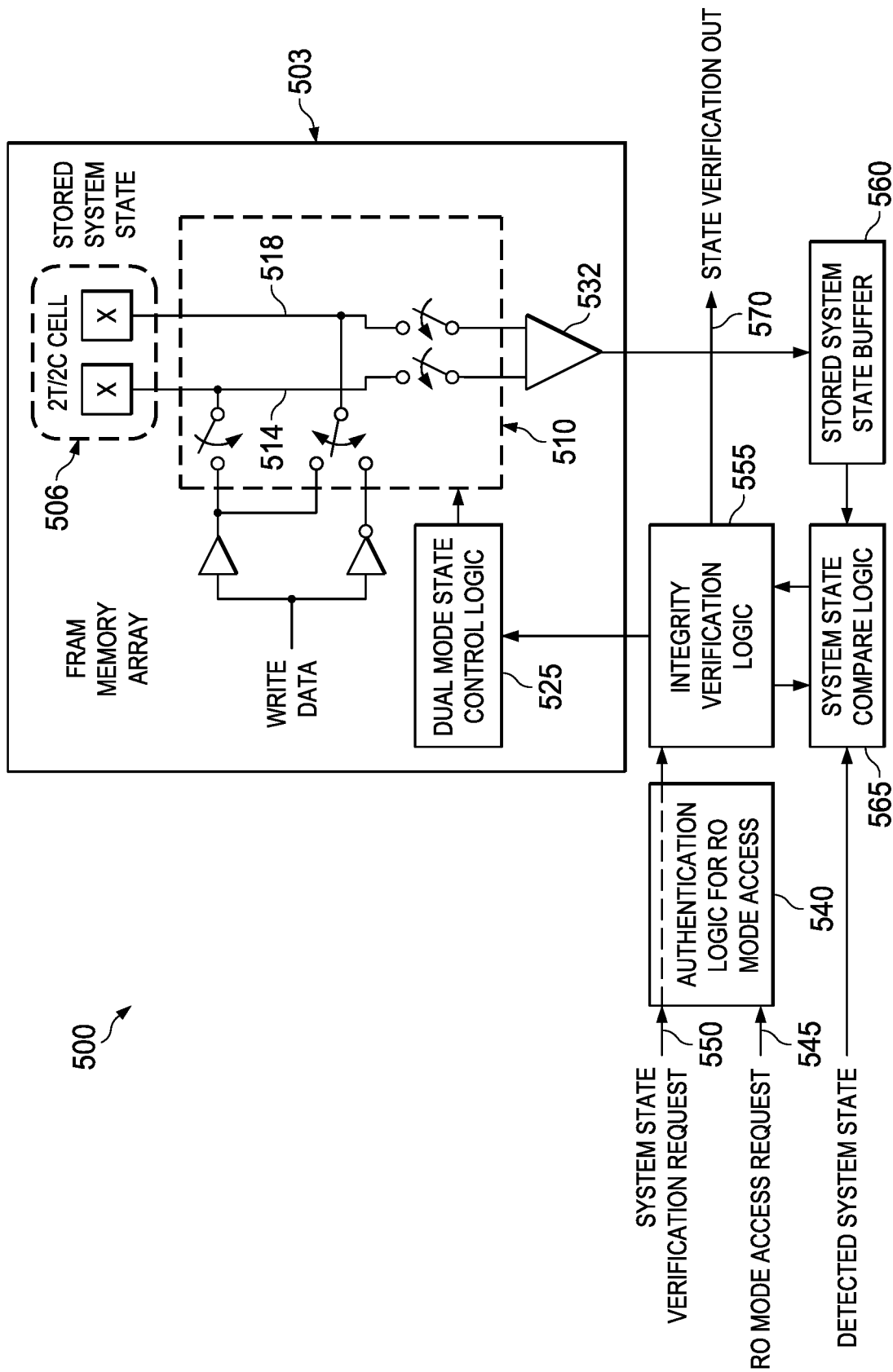
FIG. 5 is a schematic diagram of a system state verification apparatus according to various example embodiments.

FIG. 5 is a schematic diagram of a system state verification apparatus 500 according to various example embodiments. The apparatus 500 includes a dual-mode FRAM memory array 503. The dual-mode FRAM array 503 is capable of storing an imprinted RO data bit and a non-imprinted R/W data bit per array storage cell. The FRAM array includes two or more 2T/2C FRAM storage cells 506. Each 2T/2C FRAM cell consists of two half-cells. The FRAM array 503 is imprinted with RO data representing one or more predetermined states of a system to be verified. Such predetermined states may include, for example, values in processor registers during particular sequences of system operation, a hash of software machine code being executed, an ID of another chip coupled to the FRAM array 503, etc.

The FRAM array 503 also includes a switching matrix 510 coupled to each FRAM storage cell. The switching matrix 510 switches a bit line (e.g., bit lines 514 and 518) associated with each half-cell for write access to the associated FRAM cell and read access from the FRAM cell. The FRAM array 503 further includes dual mode state control logic 525 coupled to the switching matrix 518. The dual mode state control logic 525 controls switches associated with the switching matrix 510 to enable full-cell read access and both full-cell and half-cell write access. The state control logic 525 sequences the switches according to a first sequence to perform read operations of R/W data and sequences the switches according to a second sequence to perform read operations of the imprinted RO data. The FRAM array 503 also includes a sense amplifier 532 coupled to the bit lines 514 and 518. The sense amplifier senses a relative amplitude difference between the half-cell bit lines 514 and 518 and reads the state of the FRAM storage cell 506 corresponding to the polarity of the amplitude difference.

The system state verification apparatus 500 includes authentication logic 540 communicatively coupled to the FRAM array 503. The authentication logic 540 receives an authentication request for RO mode access at an input 545. If the request is authenticated, the authentication logic 540 passes a system state verification request received at an input 550.

The apparatus 500 also includes integrity verification logic 555 coupled to the authentication logic 540. The integrity verification logic 555 receives the system state verification request and responds by sequencing RO mode access commands to the FRAM array 503. Doing so reads out the RO data representing the predetermined state of the system to be verified from cells 506 of the dual-mode FRAM array 503. Some embodiments of the apparatus 500 include error-correcting code ("ECC") logic (not shown in FIG. 5) coupled to the FRAM array 503. The ECC logic corrects read errors that may occur as the RO data is read out.

Some embodiments of the system state verification apparatus 500 also include a stored system state buffer 560 coupled to the FRAM array 503. The stored system state buffer 560 provides temporary storage for some or all of the RO data representing the predetermined state during system state verification processing.

The system state verification apparatus 500 also includes system state compare logic 565 coupled to the integrity verification logic 555. The compare logic 565 receives the RO data representing the predetermined state read from the FRAM array 503 (e.g., from the buffer 560). The compare logic 565 also receives data representing a detected system state. The logic 565 compares the RO data representing the predetermined state to the data representing the detected system state. The integrity verification logic 555 sends a verification signal or one or more data bits on an output 570 back to the system to be verified. The verification signal/bits indicate whether the data representing the detected system state matches the RO data representing the predetermined state. The verification signal/bits may serve as a means to determine whether the system state has been tampered with (e.g., by introducing faults in the processor operation, by modifying software machine code to be executed, or by coupling the FRAM array to an unauthorized device).

Figure 6:
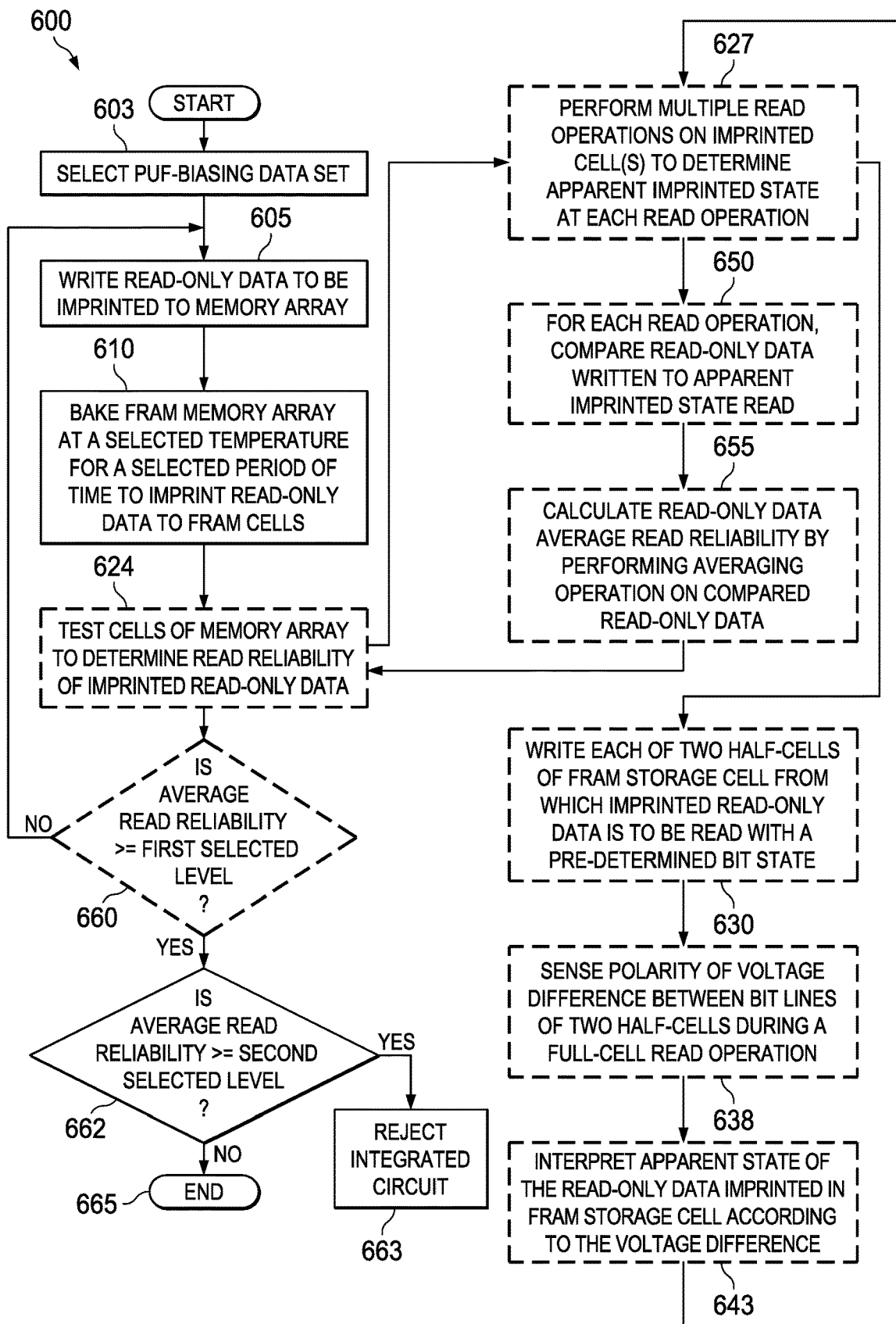
FIG. 6 is a flow diagram illustrating a method of manufacturing a FRAM array to include imprinting data as a physically unclonable function ("PUF") pattern according to various example sequences.

FIG. 6 is a flow diagram illustrating a method 600 of manufacturing a dual-mode FRAM array to include imprinting data as a PUF pattern according to various example sequences. Doing so provides a unique chip identification pattern as previously described. The FRAM array is capable of storing an imprinted RO data bit and a non-imprinted R/W data bit per array storage cell. The method 600 commences at block 603 with selecting a data set to write as the PUF pattern. Some sequences of the method 600 may bias the imprinted PUF pattern by selecting different data sets for different wafer lots.

Figure 7A:
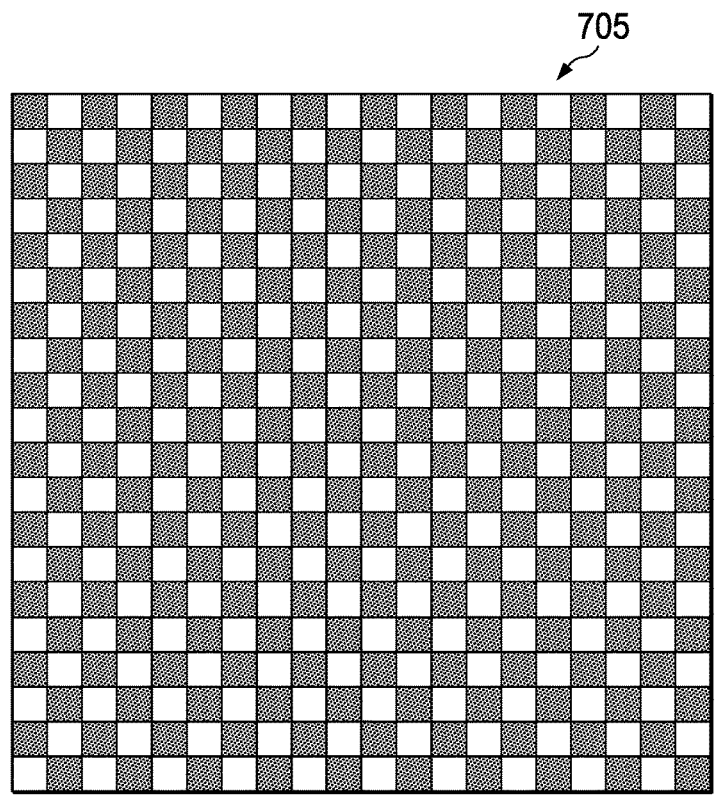
FIG. 7A is a memory cell state diagram illustrating an example data pattern to be imprinted in a FRAM array to create a PUF pattern.

FIG. 7A is a memory cell state diagram illustrating an example data pattern 705 to be imprinted in a FRAM array to create a PUF pattern.

Figure 7B:
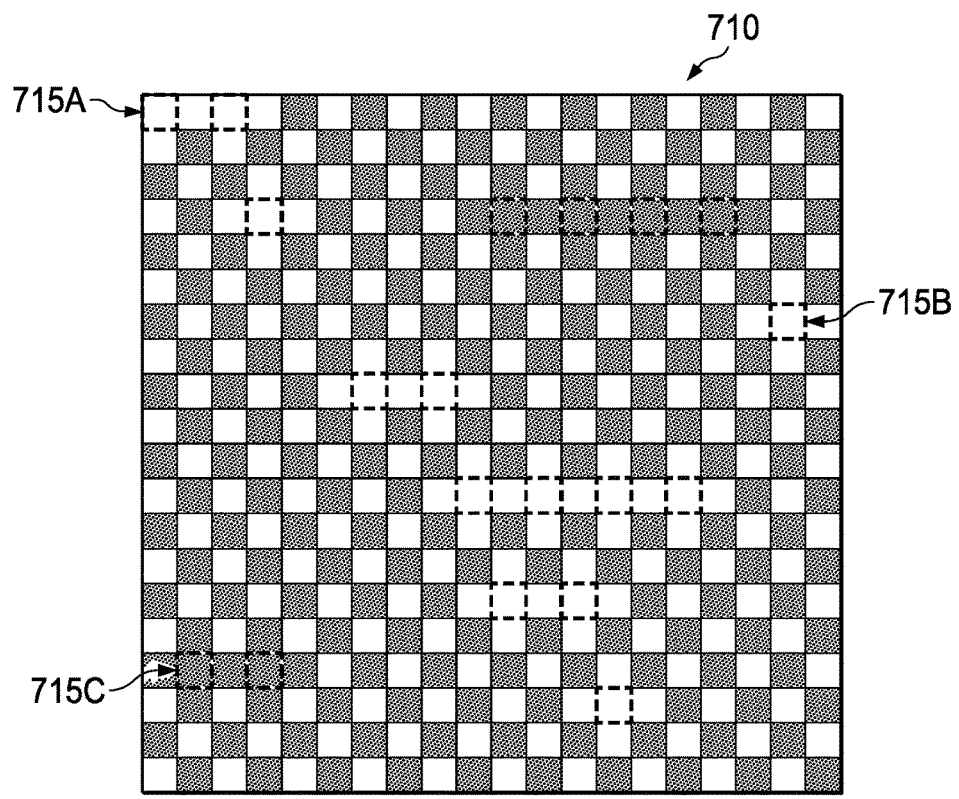
FIG. 7B is a memory cell state diagram illustrating an example PUF pattern resulting from an uneven depth of imprinting due to memory cell-to-memory cell variations during imprinting.

FIG. 7B is a memory cell state diagram illustrating an example PUF pattern 710 resulting from an uneven depth of imprinting of the data pattern 705 of FIG. 7A due to memory cell-to-memory cell variations during imprinting. Cells 715A, 715B and 715C are examples of cells shown in dashed outline which are lightly imprinted. Such lightly imprinted cells may read out to a state opposite their state in the data pattern 705 used for imprinting. In some cases the lightly-imprinted cells may read out intermittently from one read operation to another. The PUF pattern 710 is different for each FRAM array fabricated due to cell-to-cell variations which determine depth of imprint of each during one or more baking cycles. The PUF pattern 710 thus provides a digital signature unique to each part fabricated. The digital signature may be used as an identification for the part, a binary string to be used as a seed sequence for cryptography key generation, etc.

Figure 7C:
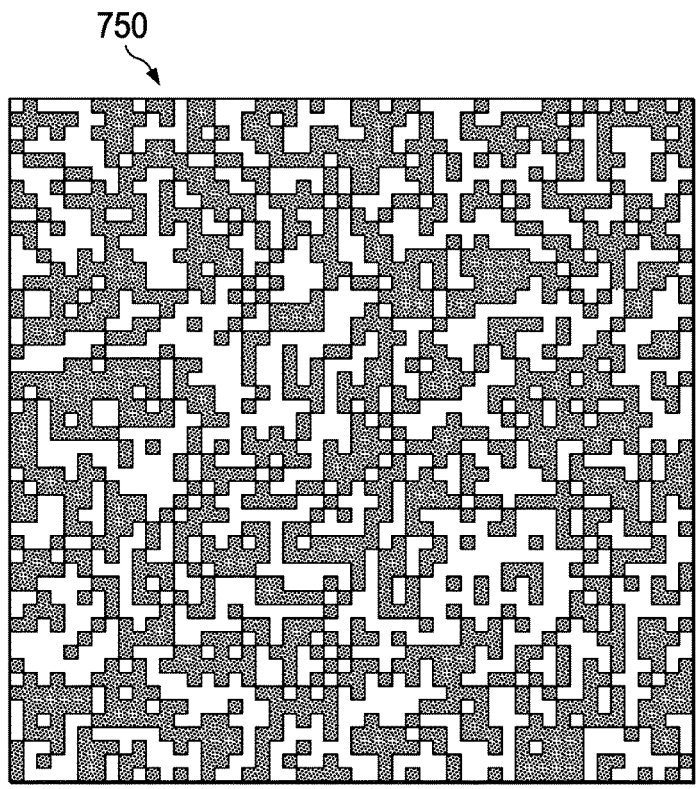
FIG. 7C is a memory cell state diagram illustrating an example data pattern to be imprinted in a FRAM array to create a PUF pattern.

FIG. 7C is a memory cell state diagram illustrating another example data pattern 750 to be imprinted in a FRAM array to create a PUF pattern.

Figure 7D:
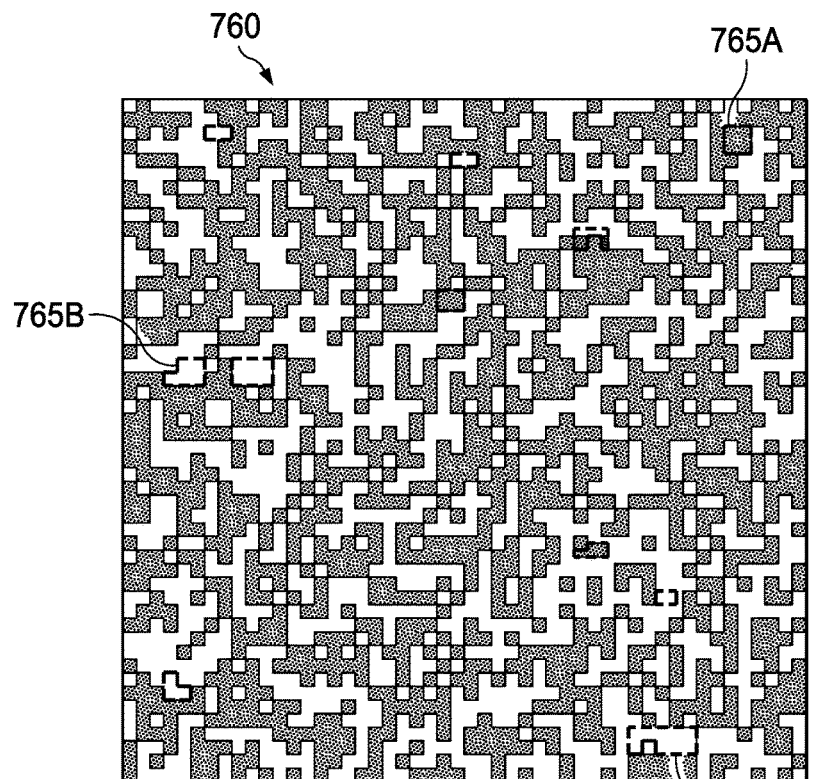
FIG. 7D is a memory cell state diagram illustrating an example PUF pattern resulting from an uneven depth of imprinting due to memory cell-to-memory cell variations during imprinting.

FIG. 7D is a memory cell state diagram illustrating an example PUF pattern 760 resulting from an uneven depth of imprinting of the data pattern 750 due to the cell-to-cell variations described above. Cells 765A, 765B and 765C are examples of cells shown in dashed outline which are lightly imprinted and thus form the basis of the PUF pattern 760. Together, FIGS. 7C and 7D may be compared to FIGS. 7A and 7B, respectively. The comparison shows that the method 600 of manufacturing a dual-mode FRAM array imprinted with a PUF may include inserting a wafer lot-to-wafer lot bias in the imprinted PUF patterns by changing the pattern to be imprinted from lot to lot. Doing so may provide for lot tracking from the resulting PUF patterns, providing that most cells are deeply imprinted and thus read back the original pattern as written immediately prior to imprinting.

Turning back to FIG. 6, the method 600 includes performing full-cell writes of the PUF pattern to storage cells of the FRAM array, at block 605. The method 600 also includes baking the FRAM array at a selected temperature for a selected period of time, at block 610. Doing so imprints the RO data to the storage cells with a selected average depth of imprint and a corresponding average read reliability.

The method 600 further includes performing testing operations on cells of the FRAM array to determine the average read reliability, at block 624. An example test sequence includes performing a plurality of RO mode read operations on the imprinted cells to determine an apparent imprinted state of each cell at each read operation, at block 627. Each RO mode read operation commences at block 630 with writing each of two half-cells of a FRAM cell from which imprinted data is to be read with a predetermined bit state. The RO mode read operation continues at block 638 with sensing a polarity of a voltage difference between bit lines of the two half-cells of the cell being read during a full-cell read operation. The RO mode read operation terminates with interpreting an apparent state of the imprinted data bit according to the voltage difference, at block 643. The read activities of blocks 630, 638 and 643 continue until a selected number of memory locations are read.

The example test sequence continues at block 650 with comparing the RO data written to each cell prior to imprinting to the apparent imprinted state of the cell as read. The example test sequence terminates with calculating an average RO data read reliability for the entire imprinted FRAM array or a portion thereof by performing averaging operations on results of the compare operations, at block 655.

The method 600 continues at block 660 with determining whether the average read reliability is greater than or equal to a first selected level. The first selected level is chosen to correspond to a desired minimum average depth of imprint such that an average selected percentage of cells reliably read back the states written prior to imprint. If the average read reliability is less than the first selected level, some versions of the method 600 may return to blocks 605-610-624 for one or more further write-bake-test sequences.

Once the average read reliability is determined to be greater than or equal to the first selected level, the method 600 continues at block 662 with determining whether the average read reliability is greater than or equal to a second selected level. The method 600 may also include rejecting an integrated circuit containing the dual-mode PUF-imprinted FRAM array if the average read reliability is greater than or equal to the second selected level, at block 663. Such a condition may mean that the array has been over-imprinted for PUF-based purposes by deeply imprinting all or most cells. Otherwise, the method 600 of manufacturing a dual-mode PUF-imprinted FRAM array concludes at block 665.

Figure 8:
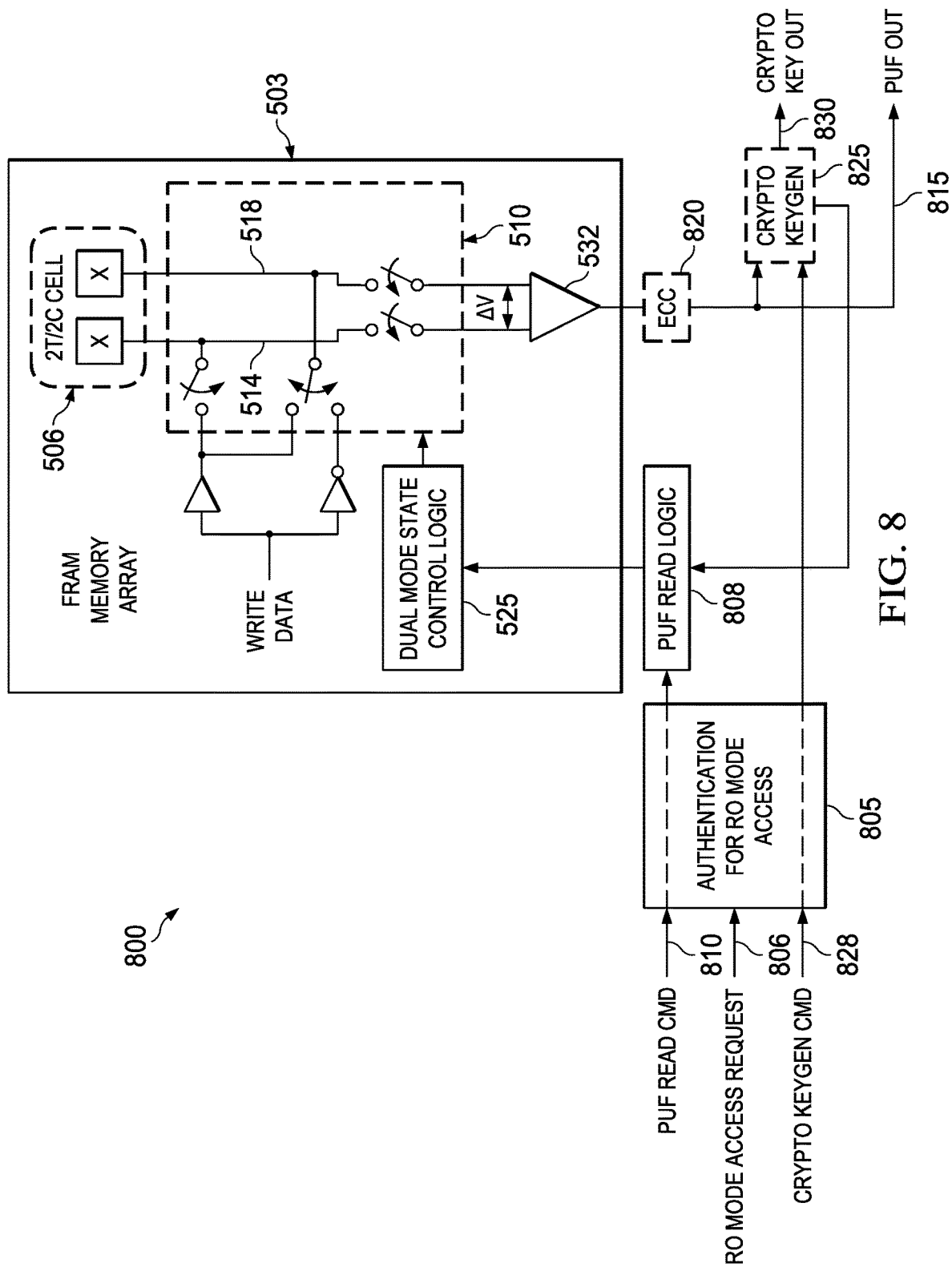
FIG. 8 is a schematic diagram of a PUF pattern generator according to various example embodiments.

FIG. 8 is a schematic diagram of a PUF pattern generator 800 according to various example embodiments. The PUF pattern generator includes a dual-mode FRAM memory array 503 capable of storing an imprinted RO data bit and a non-imprinted R/W data bit per array storage cell. The FRAM array includes two or more 2T/2C FRAM storage cells 506. Each 2T/2C FRAM cell consists of two half-cells. The FRAM array 503 is imprinted with a PUF pattern.

The FRAM array 503 also includes a switching matrix 510, two half-cell bit lines per storage cell (e.g., bit lines 514 and 518), dual mode state control logic 525, and a sense amplifier 532, all coupled together as described above with regard to FIG. 5 to perform the FRAM array functions described with regard to FIG. 1.

The PUF pattern generator 800 includes authentication logic 805 communicatively coupled to the FRAM array 503. The authentication logic 540 receives an authentication request for RO mode access at an input 806. If the request is authenticated, the authentication logic 805 passes a PUF read command received at an input 810.

The PUF pattern generator 800 also includes PUF read logic 808 communicatively coupled to the dual mode FRAM array 503 (e.g., to the dual-mode state control logic 525). The PUF read logic 808 receives the PUF read command and sequences RO mode access commands to the FRAM array 503. Doing so senses states of the FRAM array memory cells and generates an as-read PUF pattern at an output 815.

Some embodiments of the PUF pattern generator 800 also include ECC logic 820 coupled to the dual mode FRAM array 503. The ECC logic 820 performs error detection and correction operations on the as-read PUF pattern. Maintaining the as-read PUF pattern consistent for subsequent read operations may be more appropriate for certain PUF-pattern utilizing applications. For example, an application which uses the PUF pattern as a unique chip identification number (e.g., as a chip serial number) may be structured to expect to read the same pattern at each read.

Some embodiments of the PUF pattern generator 800 also include cryptographic key generation logic 830 coupled to the dual mode FRAM array 503. The cryptographic key generation logic 830 receives the as-read PUF pattern and a CRYPTO KEYGEN command. The CRYPTO KEYGEN command may be received at an input 828 of the authentication logic 805 and passed to the cryptographic key generation logic 830. The cryptographic key generation logic 830 generates a cryptographic key from the as-read PUF pattern in response to the CRYPTO KEYGEN command at an output 830.

Apparatus and methods described herein may be useful in applications other than dual mode memory cells. The examples of the apparatus 500 and 800 and of the method 600 described herein are intended to provide a general understanding of the structures of various embodiments. They are not intended to serve as complete descriptions of all elements and features of apparatus, systems and methods that might make use of these example structures and sequences.

By way of illustration and not of limitation, the accompanying figures show specific embodiments in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense. The breadth of various embodiments is defined by the appended claims and the full range of equivalents to which such claims are entitled.

Such embodiments of the inventive subject matter may be referred to herein individually or collectively by the term "invention" merely for convenience and without intending to voluntarily limit this application to any single invention or inventive concept, if more than one is in fact disclosed. Accordingly, although specific embodiments have been illustrated and described herein, any arrangement calculated to achieve the same purpose may be substituted for the specific embodiments shown. This disclosure is intended to cover any and all adaptations or variations of various embodiments.

The Abstract of the Disclosure is provided to comply with 37 C.F.R. § 1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. A system state verification apparatus, comprising:
   a dual-mode ferroelectric random access memory ("FRAM") array capable of storing an imprinted read-only ("RO") data bit and a non-imprinted read/write ("R/W") data bit per array storage cell, the FRAM array imprinted with RO data representing a predetermined state of a system to be verified;
   integrity verification logic communicatively coupled to the FRAM array to receive a system state verification request and to sequence RO mode access commands to the FRAM array in order to read the RO data representing the predetermined state; and
   system state compare logic coupled to the integrity verification logic to receive the RO data representing the predetermined state, to receive data representing a detected system state, and to compare the RO data representing the predetermined state to the data representing the detected system state.

2. The system state verification apparatus of claim 1, further comprising:
   an output of the integrity verification logic to send at least one of a signal or at least one data bit back to the system to be verified to indicate whether the data representing the detected system state matches the RO data representing the predetermined state.

3. The system state verification apparatus of claim 1, further comprising:
   a stored system state buffer coupled to the system state compare logic to store the RO data representing the predetermined state and to send the RO data to the system state compare logic.

4. The system state verification apparatus of claim 1, further comprising:
   authentication logic coupled to the integrity verification logic to receive an authentication request for RO mode access, to authenticate the RO mode access request, and to pass the system state verification request to the integrity verification logic following authentication.

5. The system state verification apparatus of claim 1, the FRAM array further comprising:
   a plurality of 2T/2C FRAM storage cells, each FRAM cell consisting of two half-cells; and
   a switching matrix coupled to each FRAM storage cell to switch a bit line associated with each half-cell for write access to the FRAM cell and read access from the FRAM cell.

6. The system state verification apparatus of claim 5, the FRAM array further comprising:
   dual mode state control logic coupled to the switching matrix and to the integrity verification logic to control switches associated with the switching matrix to enable full-cell read access and both full-cell and half-cell write access and to sequence the switches according to a first sequence to perform read operations of read/write ("R/W") data and to sequence the switches according to a second sequence to perform read operations of the imprinted RO data.

7. A method of manufacturing a dual mode double cell (2T/2C) ferroelectric random access memory (FRAM) array capable of storing an imprinted read-only ("RO") data bit and a non-imprinted read/write ("R/W") data bit per array storage cell, the FRAM array imprinted with a physically unclonable function ("PUF") pattern, comprising:
   performing full-cell writes of the PUF pattern to storage cells of the FRAM array; and
   baking the FRAM array at a selected temperature for a selected period of time to imprint the RO data to the storage cells with a selected average depth of imprint and a corresponding average read reliability.

8. The method of manufacturing a dual mode double cell FRAM array of claim 7, further comprising:
   selecting a biasing data set to write as the PUF pattern.

9. The method of manufacturing a dual mode double cell FRAM array of claim 7, further comprising:
   performing testing operations on cells of the FRAM array to determine the average read reliability.

10. The method of manufacturing a dual mode double cell FRAM array of claim 9, the testing operations further comprising:
    performing a plurality of RO mode read operations on the imprinted cells to determine an apparent imprinted state of each cell at each read operation.

11. The method of manufacturing a dual mode double cell FRAM array of claim 10, each of the plurality of RO mode read operations further comprising:
    writing each of two half-cells of a FRAM cell from which imprinted data is to be read with a predetermined bit state;
    sensing a polarity of a voltage difference between bit lines of the two half-cells during a full-cell read operation; and
    interpreting an apparent state of the imprinted data bit according to the voltage difference.

12. The method of manufacturing a dual mode double cell FRAM array of claim 10, the testing operations further comprising:
    For each read operation, comparing the RO data to the apparent imprinted state.

13. The method of manufacturing a dual mode double cell FRAM array of claim 12, the testing operations further comprising:
    calculating the average RO data read reliability by performing averaging operations on results of the compare operations.

14. The method of manufacturing a dual mode double cell FRAM array of claim 13, further comprising:
    determining whether the average read reliability is greater than or equal to a first selected level; and
    re-writing the RO data to be imprinted and performing at least one additional baking cycle if the average read reliability is less than the first selected level.

15. The method of manufacturing a dual mode double cell FRAM array of claim 14, further comprising:

determining whether the average read reliability is greater than or equal to a second selected level if the average read reliability is greater than or equal to the first selected level; and rejecting an integrated circuit containing the FRAM array if the average read reliability is greater than or equal to the second selected level.

\* \* \* \* \*